No. 862,329. PATENTED AUG. 6, 1907.
A. P. GRIEBEL.
SPARKING DYNAMO AND GOVERNOR.
APPLICATION FILED SEPT. 11, 1906.
2 SHEETS—SHEET 1.
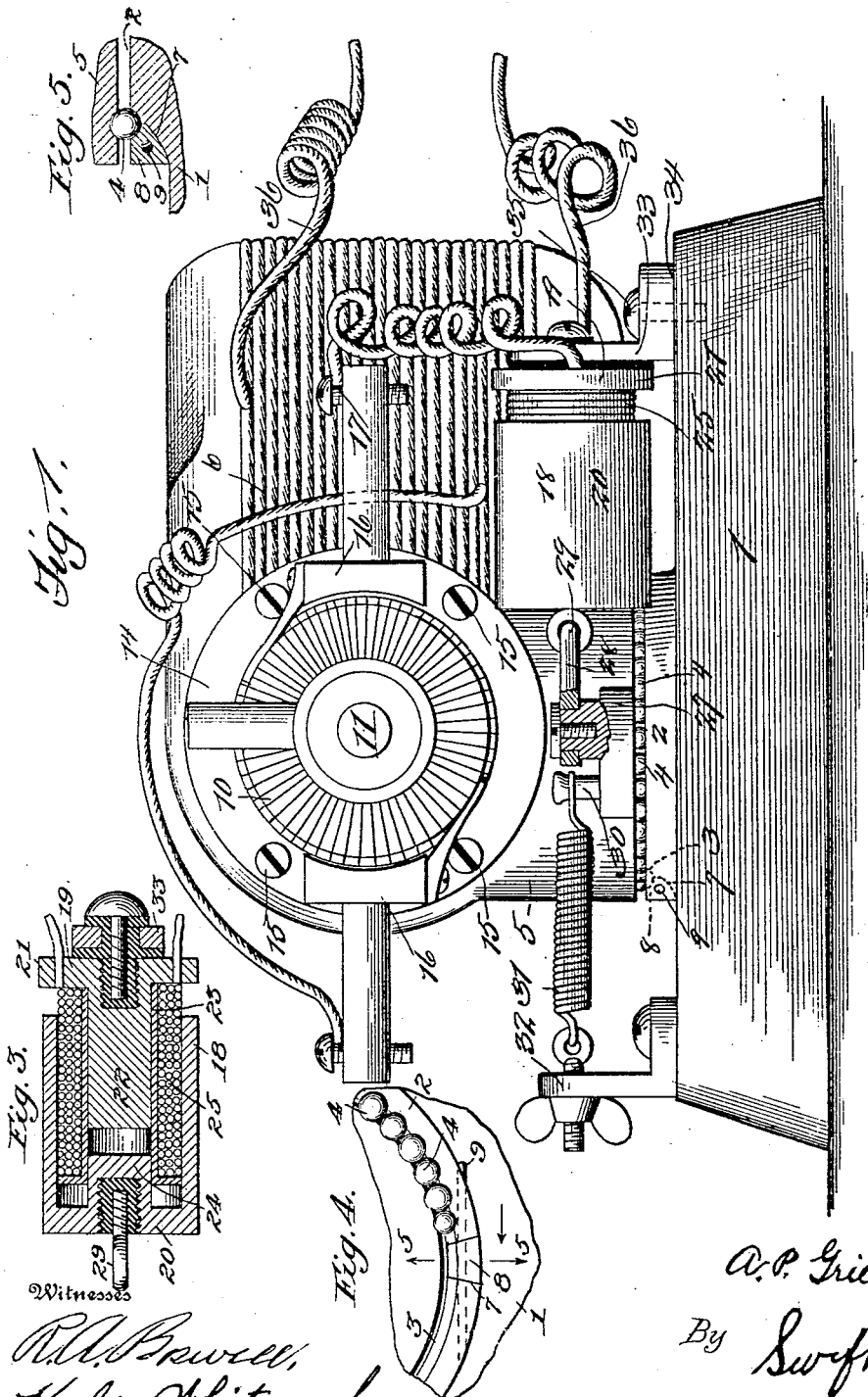

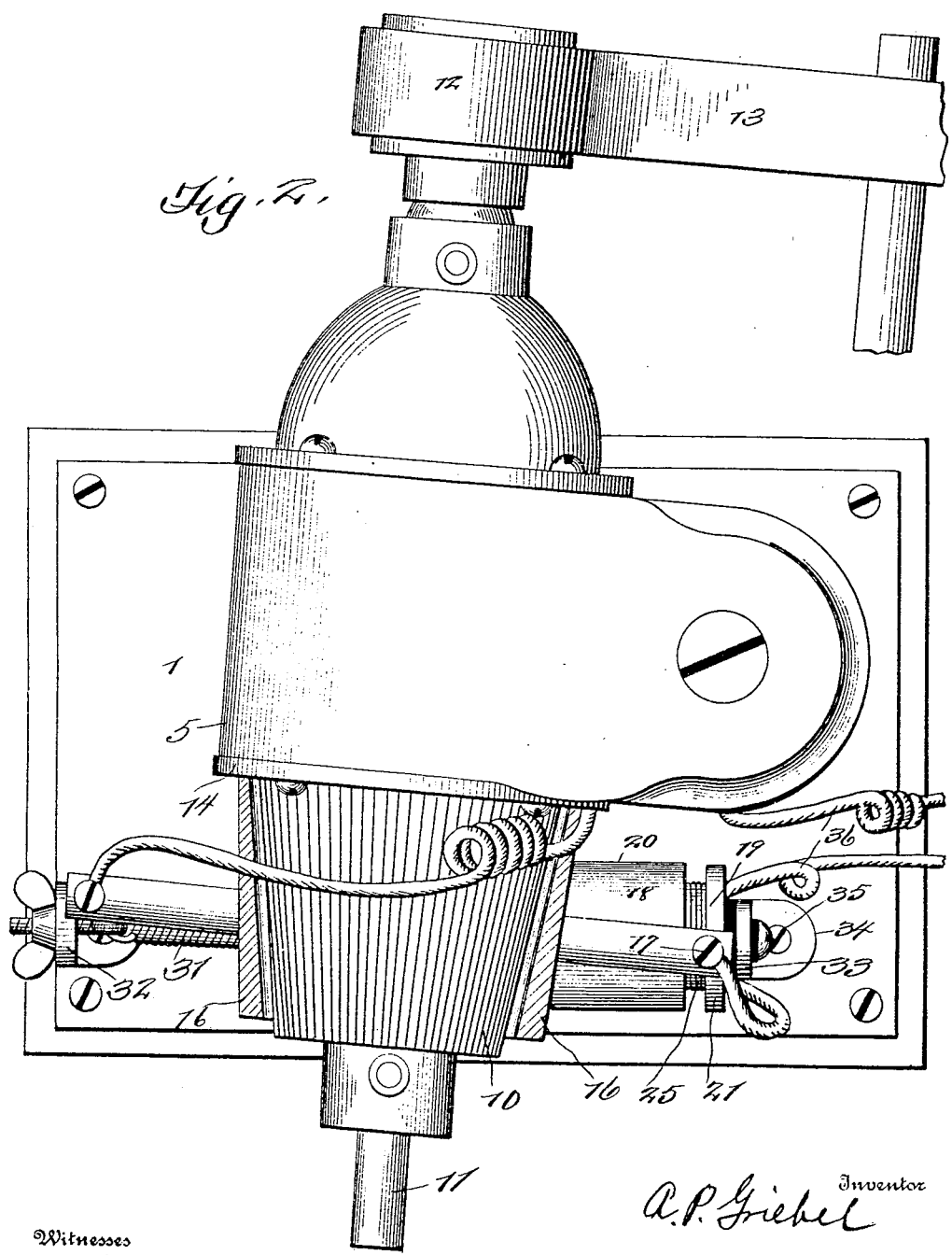

UNITED STATES PATENT OFFICE.

ALBERT P. GRIÉBEL, OF WOODSTOCK, ILLINOIS.

SPARKING DYNAMO AND GOVERNOR.

No. 862,329.　　　　Specification of Letters Patent.　　　　Patented Aug. 6, 1907.

Application filed September 11, 1906. Serial No. 334,193.

*To all whom it may concern:*

Be it known that I, ALBERT P. GRIÉBEL, a citizen of the United States, residing at Woodstock, in the county of McHenry and State of Illinois, have invented a new and useful Sparking Dynamo and Governor; and I do hereby declare the following to be a full, clear, and exact description of the invention, such as will enable others skilled in the art to which it appertains to make and use the same.

This invention relates to a spark dynamo, for use in connection with any type of gas, gasolene, or alcohol motors, or any other machine to which it is suitably adapted; the principal object thereof being to obviate the necessity of employing a ball governor, in the place of which, an electro magnetic governor is used, which is not affected by gravity or centrifugal force.

This invention comprises further objects and combinations of elements which will be hereinafter more fully described, shown in the accompanying drawings, and the novel features thereof will be pointed out by the appended claims.

To obtain a full and correct understanding of the details of construction, combinations of features, elements and advantages, reference is to be had to the hereinafter set forth description and the accompanying drawings in connection therewith, wherein Figure 1 is a side elevation of the device, clearly illustrating the essential features thereof. Fig. 2 is a top plan view of the device. Fig. 3 is a longitudinal sectional view through the magnet 18. Fig. 4 is a detail view of a portion of the ball-bearing swivel. Fig. 5 is a sectional view of the ball-bearing swivel taken on line 5—5 of Fig. 4.

Making renewed reference to the accompanying drawings, wherein similar reference characters indicate corresponding parts in the several illustrations, by figures, 1 designates the base of the device, upon which is fixed one section 2 of the ball bearing swivel, which section is provided with a race way 3 to receive the balls 4 upon which the casing 5 of the field coil 6 revolves; this casing is provided with a race way to partially receive the balls; this ball bearing swivel is for the purpose of allowing the casing 5 having the field coils 6 to have a horizontally oscillatory movement, for the purpose which will presently appear.

To remove the balls of the swivel without disassembling the same, a recess 7 is provided in the section 2, which recess receives a wedge shaped block 8, which is locked therein by means of pin 9 as shown in the drawings.

The armature 10 is provided with a shaft 11 which extends through the casing of the field coils, upon one end of which is journaled a pulley 12 which is adapted to bear frictionally against the fly wheel 13 as shown; this armature has bearing in a circular yoke 14, which is securely fastened by screws as at 15.

Carried by the yoke 14 are the brush holders 16, which are electrically wired as at 17 to the magnet 18; this magnet is composed of two telescopic sections 19 and 20; the section 19 having a disk portion 21 from one face of which a core 22 projects, around which a lining 23 of any suitable material preferably brass is formed, which lining extends beyond the core 22 for the purpose of receiving the core 24, which is of shorter length than the core 22, and is formed with the section 20, which section 20 telescopes over the section 19, that is after the lining has been suitably wound with the coils 25, through which the current of electricity passes.

Projecting from the casing of the field coils, and below the armature is an arm 27, which is provided and pivoted to a rod 28, which in turn is pivoted to the section 20, as at 29; projecting from the upper face of this arm 27 is a stud 30, to which one end of a spring 31 is connected, the other end of said spring being adjustably secured to a bracket 32 by means of a screw and thumb nut, this adjustable connection for the spring being for the purpose of regulating the pressure of the pulley 12 against the fly wheel 13, as will be manifest from the drawings.

The magnet 18 is supported by a bracket 33, which is secured as at 34 to the base, by means of a screw 35, as will be apparent. The magnet 18 and the field coils are suitably wired as at 36, so as to be electrically connected as desired. The pulley 12 may be or may not be provided with a leather covering so as to increase the friction upon the fly wheel, as will be evidenced from the drawings.

In the operation of the herein specified device, the pulley 12 having been held frictionally against the fly wheel by means of the spring 31 until the requisite voltage is obtained, thus causing the magnet 18 to be energized, thereby attracting the section 20 thereof telescopically over the section 19 against the tension of the spring; this operation would allow the casing of the field coils to oscillate through the medium of the ball bearing swivel, thus permitting the pulley 12 to lessen its frictional engagement upon the fly wheel, thereby causing the device to degenerate in power, as is evident.

It is to be understood that various changes and modifications may be employed in the construction and embodiment thereof, combinations of features, and elements for instance, such as the magnet and its connections and other details of constructions without in any way departing from the spirit and scope of the invention, it being further understood that whatever changes or modifications are embodied must fall within the scope of the appended claims.

From the foregoing the essential features, elements and the operation of the device together with the simplicity thereof will be clearly revealed and, when manufactured in harmony with the invention an inexpensive market will be easily obtained therefor.

Having thus fully described the invention what is claimed as new and useful by the protection of Letters Patent is;—

1. In a device of the character described, a base, field coils having a casing journaled thereon, said field coils having an armature, said armature having brushes to engage therewith, a ball bearing swivel between the field coils and base, a shaft rotating with the armature having a pulley keyed thereto and adapted to frictionally engage a fly wheel, an arm projecting from said casing, a spring having one end thereof connected to said arm, the other end of said spring being adjustably connected to a bracket, a magnet to coöperate against the tension of the spring when the requisite voltage is obtained and electrical connections between the magnet and armature and brushes.

2. A governor mechanism comprising an oscillatory spring-regulated field coil, a casing and an armature therefor, said armature having brushes to engage therewith, a shaft rotating with said armature adapted to frictionally engage a fly wheel, a magnet to coöperate against the action of the spring-regulated field coils, and electrical connections as and for the purpose specified.

3. A governor mechanism comprising an oscillatory spring-regulated and actuated field coils, a casing and an armature therefor, said armature having brushes to engage therewith, a shaft rotating with said armature adapted to frictionally engage a fly wheel, a magnet to coöperate against the action of the spring-regulated field coils, and electrical connections as and for the purpose specified.

In testimony whereof I have signed my name to this specification in the presence of two subscribing witnesses.

ALBERT P. GRIÉBEL.

Witnesses:
 FRED. B. BENNETT,
 FRANK R. JACKMAN.